US010919448B2

(12) United States Patent
Haas et al.

(10) Patent No.: US 10,919,448 B2
(45) Date of Patent: Feb. 16, 2021

(54) MOLDED PART AND METHOD FOR MANUFACTURING SUCH A MOLDED PART

(71) Applicant: NOVEM Car Interior Design GmbH, Vorbach (DE)

(72) Inventors: Mario Haas, Ahornthal (DE); Johannes Crux, Bayreuth (DE); Thorsten Süss, Karlsruhe (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 0 days.

(21) Appl. No.: 16/525,282

(22) Filed: Jul. 29, 2019

(65) Prior Publication Data

US 2020/0039431 A1 Feb. 6, 2020

(30) Foreign Application Priority Data

Aug. 1, 2018 (DE) ................ 10 2018 118 680.0

(51) Int. Cl.
*B60Q 3/64* (2017.01)
*B60Q 3/14* (2017.01)
*B29C 44/58* (2006.01)
*B60R 21/02* (2006.01)

(52) U.S. Cl.
CPC ............ *B60Q 3/64* (2017.02); *B29C 44/58* (2013.01); *B60Q 3/14* (2017.02); *B60R 21/02* (2013.01)

(58) Field of Classification Search
CPC .. B60Q 3/64; B60Q 3/14; B29C 44/58; B60R 21/02
See application file for complete search history.

(56) References Cited

U.S. PATENT DOCUMENTS

| 8,905,610 B2* | 12/2014 | Coleman | G02B 6/0075 362/554 |
| 2015/0138788 A1* | 5/2015 | Lee | F21S 41/141 362/478 |
| 2020/0064540 A1* | 2/2020 | Nichol | G02B 6/0088 |

FOREIGN PATENT DOCUMENTS

| DE | 102012215165 A1 | 2/2014 |
| DE | 102013021330 A1 | 6/2015 |
| DE | 102016005619 A1 | 11/2017 |
| DE | 202016003741 U1 | 11/2017 |

* cited by examiner

*Primary Examiner* — Anabel Ton
(74) *Attorney, Agent, or Firm* — Workman Nydegger

(57) ABSTRACT

A molded part comprises a decorative layer having a visible front side, a rear side, and a backing that is situated on the rear side of the decorative layer. The decorative layer comprises a decorative ply having a front side, a rear side that faces the backing, a light-conducting optical layer, situated between the front side of the decorative ply and the front side of the decorative layer, having a first refractive index. Situated in at least one symbol area of the decorative layer, between the decorative ply and the optical layer, is a transparent or translucent effect layer for displaying one or more symbols, and that has a second refractive index that is different from the first refractive index. The molded part includes a first light system for scattering light internally about the symbol, and a second light system for illuminating a front side of the symbol externally.

15 Claims, 2 Drawing Sheets

MOLDED PART AND METHOD FOR MANUFACTURING SUCH A MOLDED PART

CROSS-REFERENCE TO RELATED APPLICATIONS

This application claims the benefit of priority to German Patent Application No. DE 10 2018 118 680.0, filed on Aug. 1, 2018, entitled "Formteil und Verfahren zum Herstellen einen solchen Formteils," the entire content of which is incorporated herein by reference.

BACKGROUND OF THE INVENTION

1. Technical Field

The invention relates to a molded part, in particular a decorative part and/or trim part for a vehicle interior that is designed as a molded part. The invention further relates to a method for manufacturing such a molded part.

2. Background and Relevant Art

Numerous decorative parts and trim parts, for example door trim, consoles, and instrument panels, are installed in the interior of a vehicle. The decorative parts and trim parts also include control buttons and their covers.

In particular for molded parts in motor vehicles, symbols such as function symbols are displayed on the visible side of the decorative layer of the molded parts. The area of the decorative layer on which a symbol is displayed on the visible side is referred to below as the symbol area.

In particular in the automotive sector, a symbol display is desirable which in a functional position is clearly perceptible or visible, and in a nonfunctional position disappears. It is known from the publication DE 10 2010 017 494 B4, for example, to provide light openings in the decorative layer of a molded part, which in a functional position are backlit for displaying the symbol, and in a nonfunctional position are not backlit. During backlighting, the symbol is visible, for example at the location of a switch. However, in a nonfunctional position in which the backlighting is completely switched off, the symbol does not fully disappear. Instead, upon close examination the symbol is still discernible due to the light openings

BRIEF SUMMARY OF THE INVENTION

The object of the object, therefore, is to provide a novel molded part, in particular a molded part with which symbols on the front side of the decorative layer of the molded part, designed as the visible side, are displayable in a functional position, and in a nonfunctional position essentially completely, preferably completely, disappear. A further object of the invention is to provide a novel method for manufacturing such a molded part.

With regard to the molded part, this object is achieved by the features of Claim 1, and with regard to the method, by the features of Claim 9. Advantageous embodiments and refinements are set forth in the respective dependent claims.

The molded part according to the invention includes a decorative layer having a front side, designed as the visible side, and a rear side, and a backing that is situated on the rear side of the decorative layer.

The decorative layer comprises a preferably opaque decorative ply having a front side, and a rear side that faces the backing, and a light-conducting optical layer, situated between the front side of the decorative ply and the front side of the decorative layer, having a first refractive index. Situated in at least one symbol area of the decorative layer, between the decorative ply and the optical layer, is a transparent or translucent effect layer for displaying one or more symbols, in particular to an observer of the visible side of the molded part, and that has a second refractive index that is different from the first refractive index.

The optical layer thus covers the effect layer and further areas of the decorative ply, and preferably extends over the entire front side of the decorative ply.

The molded part further comprises at least two light systems.

A first light system is mounted or provided at the side of the optical layer for coupling light that is guided in the optical layer and reflected and/or scattered and/or refracted on the effect layer for displaying the symbol.

A second light system is situated in such a way that light of the second light system externally illuminates a front side of the optical layer, at least in the symbol area of the decorative layer, and this light is reflected and/or scattered and/or refracted on the front side of the optical layer. The second light system may be a so-called light waterfall, for example, that floods the front side of the optical layer with light.

The first light system and/or the second light system may each include one or more light sources and/or one or more optical fibers.

The advantages of the invention in particular are that the at least two light systems provide various illumination options, and in addition, the design of the molded part allows the complete or essentially complete disappearance of the symbol(s) for an observer of the visible side of the molded part when no symbol is to be displayed.

When the first light system is not switched on, the effect layer is not, or is at least hardly, perceptible, so that the symbol completely or essentially completely disappears, in particular even when the second light system is switched off.

When the first light system is switched on and the second light system is switched off, the symbol(s) to be displayed by the effect layer is/are visible as luminous symbol(s) due to the light reflection or light scattering or light diffraction on the effect layer on the visible side, in front of an illuminated and thus likewise visible front side of the decorative ply, that is brought about by the conduction of light through the optical layer, and which thus forms ambient lighting around the symbol. In this case, the symbol display and the ambient lighting are always present together.

When the first light system is switched off and the second light system is switched on, the light which illuminates the front side of the optical layer and which is totally reflected there due to lateral radiation (total reflection) outshines the differences between the decorative ply and the effect layer behind the optical layer, resulting in uniform ambient lighting without a symbol or symbols. In this case the symbol(s) thus completely disappear(s), and ambient lighting without a symbol display is therefore possible.

In the present case, if the first light system is additionally switched on, the result is dependent on the light intensity of the first light system in comparison to the light intensity of the second light system. For a first light intensity that is sufficiently strong in comparison, the symbol(s) is/are visible in front of the background of the ambient lighting.

The term "symbol" is to be broadly construed; for example, it may involve one or more function symbols as well as geometric patterns or shapes and/or decorative elements, for example lines. In addition, for example one or more letters or a logo or a motif may be involved.

The decorative ply may be a wood veneer and/or an aluminum ply and/or a carbon ply and/or a plastic ply and/or a fabric ply and/or a textile ply, for example. The backing preferably contains plastic or is made of plastic.

According to one refinement of the invention, it is provided that in the symbol area or in the symbol areas of the decorative layer at least one light opening is provided in the decorative ply, wherein the at least one light opening for light conduction extends through the decorative ply from the rear side of the decorative ply to the front side of the decorative ply.

It may further be provided that a plurality of light openings is provided in the decorative ply in the symbol area or in the symbol areas of the decorative layer. The plurality of light openings may be introduced into the decorative ply by microperforation, for example.

According to one embodiment variant of the invention, a third light system, which preferably includes one or more light sources and/or one or more optical fibers, for shining through the at least one light opening is provided on or in the backing. As a result, the effect layer is backlit and the symbol(s) to be displayed by the effect layer is/are visible on the visible side. It may be provided that the third light system is provided on the rear side of the backing and/or in a recess in the backing.

The light opening or light openings and the third light system expand the above-described illumination options with further options. Thus, in this embodiment variant the symbol(s) may now be luminously displayed on the visible side, even with the first and second light systems switched off, in particular without ambient lighting. This is not possible by switching on the first light system, since in this case the ambient lighting always appears. The same applies for switching on the second light system. Of course, further combinations are also possible by switching the three light systems on and off, for example the ambient lighting via the second light system in combination with a comparatively highly luminous third light system that additionally makes the symbols apparent, but without illuminating the front side of the decorative ply (in contrast to the symbol display by activating the first light system). Also possible is more intense lighting of the symbol(s) by activating the third light system in addition to the activated first light system, in front of constant ambient lighting by the first light system.

The backing preferably comprises two components, for example made of different materials, wherein at least one first component is permeable to light. In particular, the backing is manufactured in a two-component injection molding process. The first component is preferably provided in an area of the backing that adjoins the light openings in the decorative ply. The third light system is preferably provided on or in the first component of the backing.

The effect layer is preferably molded into the optical layer or is molded over by the optical layer or is overmolded with the optical layer. The optical layer preferably includes PUR and/or PA and/or PC and/or PMMA or is made of PUR and/or PA and/or PC and/or PMMA.

According to one particularly preferred embodiment variant of the invention, the effect layer is or includes a printed layer, wherein the printed layer is imprinted on the decorative ply. The printed layer is preferably a colorless printed layer. As an alternative and/or in addition to the printed layer, a partial spray application, in particular a colorless partial spray application, may be provided.

The second light system may be situated outside the front side of the optical layer in a side area of the molded part.

The molded part preferably has a control device for controlling the light systems (first and/or second and/or third light system), wherein the activation of the light systems is controllable by means of the control device, and/or wherein the light intensity and/or the light color of one or more of the light systems are/is controllable by means of the control device.

The method according to the invention for manufacturing the molded part according to the invention comprises the steps: providing a material that is intended to form the decorative ply, applying the transparent or translucent effect layer, having a second refractive index in the symbol area or in the symbol areas, to the front side of the decorative ply, applying a light-conducting material having a first refractive index to form the optical layer, mounting the backing on the rear side of the decorative layer, in particular by injection molding, mounting or providing the first light system at the side of the optical layer in such a way that the light of the first light system is guided in the optical layer and is reflected and/or scattered and/or refracted on the effect layer for displaying the symbol, mounting or providing the second light system in such a way that light of the second light system externally illuminates the front side of the optical layer, at least in the symbol area of the decorative layer, and this light is reflected and/or scattered and/or refracted on the front side of the optical layer.

The above listing of the steps does not stipulate the order of the steps for mounting the backing to the rear side of the decorative layer, in particular by injection molding. Thus, the mounting of the backing on the rear side of the decorative layer may take place after the optical layer is formed. Alternatively, however, the backing may also be mounted on the rear side of the decorative layer before the optical layer is formed, for example directly before the optical layer is formed, or also directly after provision of the material that is intended to form the decorative ply.

At least one light opening may be provided in the decorative ply in the symbol area(s) of the decorative layer in such a way that the at least one light opening extends through the decorative ply from the rear side of the decorative ply to the front side of the decorative ply.

It may also be provided that a plurality of light openings is provided in the symbol area(s) of the decorative ply, wherein the plurality of light openings is introduced into the decorative ply by microperforation, for example.

The light opening(s) may be introduced into the decorative ply by means of a laser, for example. Alternatively, the light openings may also be introduced by punching into the decorative ply.

According to one embodiment variant of the method according to the invention, a third light system for shining through at least one light opening is provided on or in the backing in the area of the at least one light opening, wherein the third light system preferably includes one or more light sources and/or optical fibers. In this way, when the third light system is activated, light that radiates through the light openings backlights the effect layer and is thus visible on the visible side.

The effect layer is preferably molded into the optical layer or is molded over by the optical layer or is overmolded with the optical layer The effect layer is particularly preferably a printed ply that is imprinted on the decorative ply. As an alternative or in addition to the printed ply, a partial spray application that is sprayed onto the decorative ply may also be provided.

The second light system may be situated outside the front side of the optical layer in a side area of the molded part.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The invention is explained in greater detail below with regard to further features and advantages, with reference to the description of exemplary embodiments and the appended schematic drawings, which show the following.

DETAILED DESCRIPTION OF THE PREFERRED EMBODIMENTS

Figure 1:
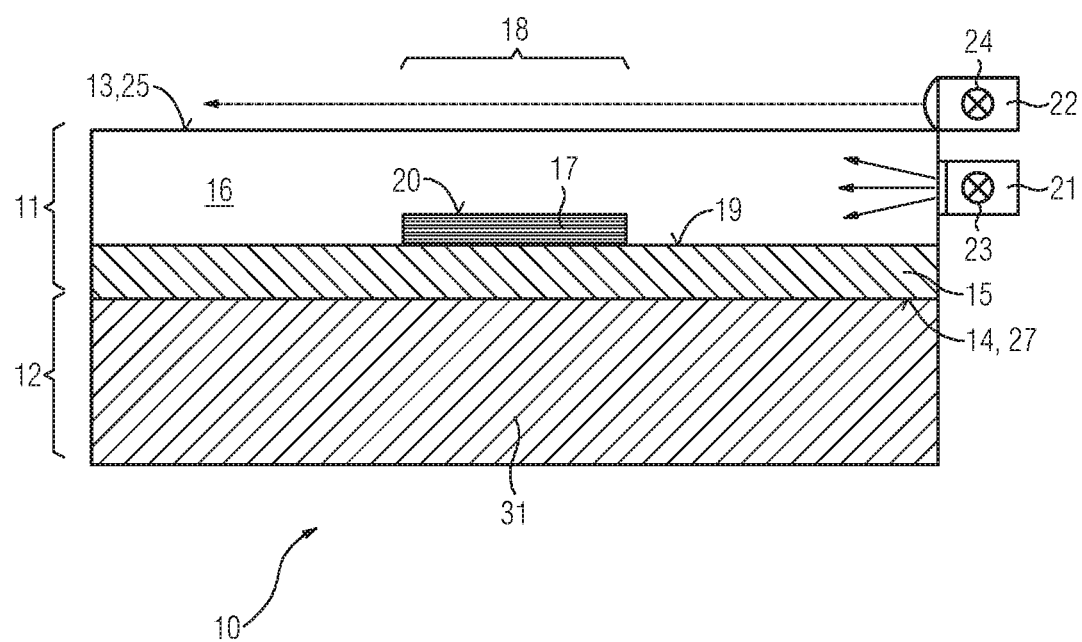
FIG. 1 shows a schematic cross-sectional illustration of one exemplary embodiment of a molded part according to the invention.
Figure 2:
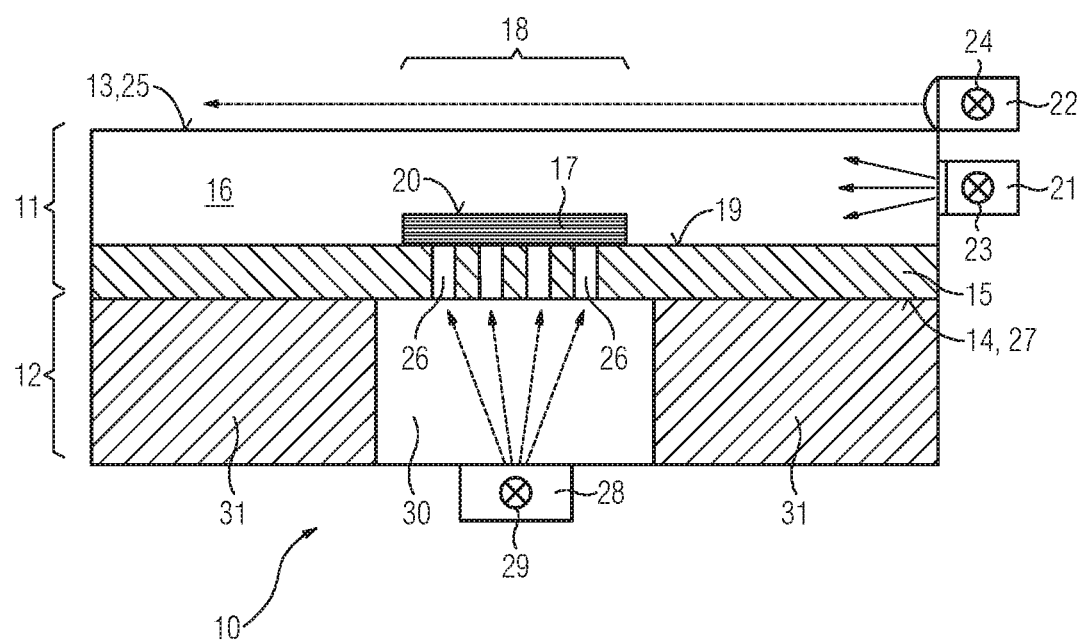
FIG. 2 shows a schematic cross-sectional illustration of another exemplary embodiment of a molded part according to the invention

FIGS. 1 and 2 each show a molded part 10 having a decorative layer 11 that has a front side 13, designed as the visible side, and a rear side 14. An at least partially light-permeable backing 12 is situated on the rear side 14 of the decorative layer 11.

The decorative layer 11 includes an opaque decorative ply 15 and a light-conducting optical layer 16 having a first refractive index. The decorative ply 15 has a rear side 27 that faces the backing 12, and a front side 19. The optical layer 16 is situated between the front side 19 of the decorative ply 15 and the front side 13 of the decorative layer 11, wherein the front side 13 of the decorative layer 11 is formed by a front side 25 of the optical layer 16.

A transparent or translucent effect layer 17 having a second refractive index that is different from the first refractive index is situated in a symbol area 18 of the decorative layer 11, between the decorative ply 15 and the optical layer 16. The effect layer 17 is provided only in the symbol area 18; outside the symbol area, the optical layer 16 directly adjoins the front side 19 of the decorative ply 15. The effect layer 17 is used to display one or more symbols to an observer of the visible side of the molded part 10. A front side 20 of the effect layer 17 having a second refractive index adjoins the optical layer 16 having a first refractive index. The differing refraction indices are essential for, or at least contribute to, the visibility of the effect layer, and thus, of the symbol to be displayed to an observer of the visible side of the molded part 10.

The effect layer 17 is molded over by the optical layer 16, wherein the optical layer 16 is made of PUR and/or PA and/or PC and/or PMMA. The effect layer 17 is a printed layer, wherein the printed layer is imprinted on the decorative ply 15. The printed layer may be a colorless printed layer.

In the exemplary embodiment shown, the optical layer 16 extends over the entire front side 19 of the decorative ply 15, the effect layer 17 being covered by the optical layer 16.

The exemplary embodiment of a molded part 10 according to FIG. 1 comprises two light systems 21, 22, and the exemplary embodiment of a molded part 10 according to FIG. 2 comprises three light systems 21, 22, 28.

The first light system 21 includes a first light source 23, and is mounted at the side of the optical layer 16 for lateral coupling of light into the optical layer 16. Light emitted by the first light source 23, and thus by the first light system 21, is laterally coupled into the light-conducting optical layer 16, and in the optical layer 16, among other things, is conducted to the effect layer 17 and reflected and/or scattered and/or refracted on same. The reflected and/or scattered and/or refracted light rays are used to display the symbol to an observer of the visible side of the molded part 10.

The second light system 22 includes a second light source 24, and is situated outside the front side 25 of the optical layer 16 in a side area of the molded part 10, in particular in such a way that light emitted by the second light source 24, and thus by the second light system 22, externally illuminates the front side 25 of the optical layer 16. The light is reflected and/or scattered and/or refracted at that location.

The exemplary embodiment according to FIG. 2 differs from the exemplary embodiment according to FIG. 1, among other ways, in that the decorative ply 15 does not have a uniform design; rather, in the symbol area 18 of the decorative layer 11, a plurality of light openings 26 is provided in the decorative ply 15 that extend through the decorative ply 15 from the rear side 27 of the decorative ply 15 to the front side 19 of the decorative ply 15. The light openings 26 are provided for conducting light from the rear side 27 of the decorative ply 15 to the front side 19 of the decorative ply 15. The plurality of light openings 26 may be introduced into the decorative ply 15 by microperforation. The effect layer 17 covers the light openings 26 and is therefore backlit by them via the light conduction described above. It is thus possible to display one or more symbols to an observer of the visible side of the molded part 10.

The light for shining through the light openings 26 originates from the third light system 28, which includes a third light source 29. The third light system 28 is provided on the rear side of the backing 12, in particular in an area of the backing that adjoins the light openings 26.

In the exemplary embodiment according to FIG. 2, the backing 12 comprises two components 30, 31 made of different materials, wherein at least one first component 30 is permeable to light. The first component 30 is provided in an area of the backing 12 that adjoins the light openings 26. The third light system 28 is provided on the first component 30 of the backing 12. In contrast, the exemplary embodiment according to FIG. 1 has a uniform backing comprising only one component 31, and is thus made of only one material that extends continuously on the rear side 14 of the decorative layer. This component 31 may have an opaque design. However, a transparent or translucent design is also possible.

The molded part 10 also includes a control device (not illustrated in the figures) for controlling the light systems 21, 22 (exemplary embodiment according to FIG. 1) or 21, 22, 28 (exemplary embodiment according to FIG. 2), wherein the activation of the light systems 21, 22 or 21, 22, 28 is controllable by means of the control device, and wherein the light intensity and/or the light color of one or more of the light systems 21, 22 or 21, 22, 28 are/is controllable by means of the control device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OR REFERENCE NUMERALS 10 molded part
11 decorative layer
12 backing
13 front side (of the decorative layer)
14 rear side (of the decorative layer)
15 decorative ply
16 optical layer
17 effect layer
18 symbol area
19 front side (of the decorative ply)
20 front side (of the effect layer)
21 first light system
22 second light system
23 first light source
24 second light source
25 front side (of the optical layer)
26 light opening
27 rear side (of the decorative ply)
28 third light system
29 third light source
30 component of the backing
31 component of the backing

We claim:

1. A molded part, comprising:
a decorative layer having a front side designed as the visible side, and a rear side, and a backing that is situated on the rear side of the decorative layer;
wherein the decorative layer comprises a decorative ply having a front side, and a rear side that faces the backing, and a light-conducting optical layer, situated between the front side of the decorative ply and the front side of the decorative layer, having a first refractive index;
wherein situated in at least one symbol area of the decorative layer, between the decorative ply and the optical layer, is a transparent or translucent effect layer for displaying one or more symbols, and that has a second refractive index that is different from the first refractive index;
wherein the molded part includes a first light system that is mounted or provided at the side of the optical layer for coupling light that is guided in the optical layer, wherein the light of the first light system is reflected on the effect layer for displaying the symbol;
wherein the molded part includes a second light system that is situated in such a way that light of the second light system externally illuminates a front side of the optical layer, at least in the symbol area of the decorative layer, wherein the light of the second light system is reflected on the front side of the optical layer.

2. The molded part according to claim 1, wherein:
in the symbol area or in the symbol areas of the decorative layer at least one light opening is provided in the decorative ply; and
the at least one light opening for light conduction extends through the decorative ply from the rear side of the decorative ply to the front side of the decorative ply.

3. The molded part according to claim 2, wherein:
a plurality of light openings is provided in the decorative ply in the symbol area or in the symbol areas of the decorative layer, wherein the plurality of light openings is introduced into the decorative ply by microperforation.

4. The molded part according to claim 2, wherein:
a third light system for shining through the at least one light opening is provided on or in the backing.

5. The molded part according to claim 1, wherein:
the effect layer is molded into the optical layer or is molded over by the optical layer or is overmolded with the optical layer.

6. The molded part according to claim 1, wherein:
the effect layer includes at least one of: a printed layer and a partial spray application, wherein the printed layer is imprinted on the decorative ply and the spray application is sprayed onto the decorative ply.

7. The molded part according to claim 1, wherein:
the second light system is situated outside the front side of the optical layer in a side area of the molded part.

8. The molded part according to claim 1, wherein:
the molded part has a control device for controlling the light systems;
the activation of the light systems is controllable by means of the control device, and
at least one of (i) the light intensity, and (ii) the light color of one or more of the light systems is controllable by means of the control device.

9. A method for manufacturing a molded part, comprising:
providing a material that is intended to form a decorative ply;
applying or providing a transparent or translucent effect layer, having a second refractive index in one or more symbol areas, on a front side of the decorative ply;
applying a light-conducting material having a first refractive index to form an optical layer;
mounting a backing on a rear side of a decorative layer;
mounting or providing a first light system at a side of the optical layer in such a way that light of a first light system is guided in the optical layer and is reflected on an effect layer for displaying the symbol;
mounting or providing a second light system in such a way that light of the second light system externally illuminates a front side of the optical layer, at least in the symbol area of the decorative layer, and this light of the second light system is reflected on the front side of the optical layer.

10. The method according to claim 9, wherein:
in the symbol area or in the symbol areas of the decorative layer, at least one light opening is provided in the decorative ply in such a way that the at least one light opening extends through the decorative ply from the rear side of the decorative ply to the front side of the decorative ply.

11. The method according to claim 10, wherein:
a plurality of light openings is provided in the symbol area or in the symbol areas of the decorative ply; and
the plurality of light openings is introduced into the decorative ply by microperforation.

12. The method according to claim 10, wherein:
a third light system for shining through the at least one light opening is provided on or in the backing in the area of the at least one light opening.

13. The method according to claim 9, wherein:
the effect layer is molded into the optical layer or is molded over by the optical layer or is overmolded with the optical layer.

14. The method according to claim 9, wherein the effect layer is:
at least one of (i) a printed ply that is imprinted on the decorative ply, and (ii) a partial spray application that is sprayed onto the decorative ply.

15. The method according to claim 9, wherein:
the second light system is situated outside the front side of the optical layer in a side area of the molded part.

* * * * *